United States Patent
Thornton

(10) Patent No.: US 11,713,909 B2
(45) Date of Patent: Aug. 1, 2023

(54) MOTOR COOLING RETURN THROUGH HOLLOW SHAFT

(71) Applicant: Danfoss A/S, Nordborg (DK)

(72) Inventor: William Turner Thornton, Tallahassee, FL (US)

(73) Assignee: Danfoss A/S

( * ) Notice: Subject to any disclaimer, the term of this patent is extended or adjusted under 35 U.S.C. 154(b) by 350 days.

(21) Appl. No.: 17/116,069

(22) Filed: Dec. 9, 2020

(65) Prior Publication Data

US 2022/0178593 A1   Jun. 9, 2022

(51) Int. Cl.
*H02K 1/32* (2006.01)
*F25B 31/00* (2006.01)
*H02K 9/19* (2006.01)
*F25B 31/02* (2006.01)
*H02K 1/20* (2006.01)

(52) U.S. Cl.
CPC .......... *F25B 31/006* (2013.01); *F25B 31/026* (2013.01); *H02K 9/19* (2013.01); *H02K 1/20* (2013.01); *H02K 1/32* (2013.01)

(58) Field of Classification Search
CPC ... H02K 9/19; H02K 1/20; H02K 1/32; F25B 31/006; F25B 31/026
See application file for complete search history.

(56) References Cited

U.S. PATENT DOCUMENTS

| | | | | |
|---|---|---|---|---|
| 3,306,074 A | * | 2/1967 | Wilson | F25B 31/002 62/505 |
| 10,036,582 B2 | | 7/2018 | Thornton et al. | |
| 2009/0044548 A1 | * | 2/2009 | Masoudipour | F25B 1/04 62/505 |
| 2016/0138841 A1 | * | 5/2016 | Thornton | F25B 1/053 62/505 |
| 2017/0268806 A1 | * | 9/2017 | Knopp | F04D 25/0606 |

FOREIGN PATENT DOCUMENTS

DE   10120240 A1 *   3/2002   .......... F04B 27/0895

OTHER PUBLICATIONS

DE-10120240-A1 Translation (Year: 2002).*

* cited by examiner

*Primary Examiner* — David J Teitelbaum
(74) *Attorney, Agent, or Firm* — Carlson, Gaskey & Olds, P.C.

(57) ABSTRACT

This disclosure relates to a compressor having a shaft, wherein the shaft is hollow to define a fluid passage extending along the shaft and a motor arranged along the shaft. A motor cooling line is configured to convey a cooling fluid to the motor, wherein the motor cooling line is fluidly connected to the fluid passage. The compressor may be a refrigerant compressor used in a heating, ventilation, and air conditioning (HVAC) chiller system.

13 Claims, 3 Drawing Sheets

MOTOR COOLING RETURN THROUGH HOLLOW SHAFT

TECHNICAL FIELD

This disclosure relates to a compressor having a motor and a hollow shaft. The compressor may a refrigerant compressor, which may be used in a heating, ventilation, and air conditioning (HVAC) chiller system, for example.

BACKGROUND

Refrigerant compressors are used to circulate refrigerant in a chiller via a refrigerant loop. Refrigerant loops are known to include a condenser, an expansion device, and an evaporator. The compressor compresses the fluid, which then travels to a condenser, which in turn cools and condenses the fluid. The refrigerant then goes to an expansion device, which decreases the pressure of the fluid, and to the evaporator, where the fluid is vaporized, completing a refrigeration cycle.

Many refrigerant compressors are centrifugal compressors and have an electric motor that drives at least one impeller to pressurize refrigerant. The at least one impeller is mounted to a rotatable shaft. The motor in some examples is an electric motor including a rotor and a stator. In one known example the motor is cooled by circulating refrigerant about the stator, to cool the stator, and then directing that refrigerant between the rotor and the stator to cool the rotor. After cooling the rotor, the refrigerant is returned to a refrigeration loop.

SUMMARY

A refrigerant compressor according to an exemplary aspect of the present disclosure includes, among other things, a shaft, wherein the shaft is hollow to define a fluid passage extending along the shaft and a motor arranged along the shaft. A motor cooling line is configured to convey a cooling fluid to the motor, wherein the motor cooling line is fluidly connected to the fluid passage.

In a further non-limiting embodiment of the foregoing refrigerant compressor, the motor is configured to rotationally drive a compression stage via the shaft.

In a further non-limiting embodiment of the foregoing refrigerant compressor, the motor cooling line comprises a stator cooling passageway and a rotor cooling passageway.

In a further non-limiting embodiment of the foregoing refrigerant compressor, the stator cooling passageway and the rotor cooling passageway join at an inlet of the fluid passage.

In a further non-limiting embodiment of the foregoing refrigerant compressor, the stator cooling passageway and the rotor cooling passageway join upstream of the motor.

In a further non-limiting embodiment of the foregoing refrigerant compressor, the stator cooling passageway extends circumferentially about a rotor of the motor.

In a further non-limiting embodiment of the foregoing refrigerant compressor, the rotor cooling passageway extends between a rotor and a stator of the motor.

In a further non-limiting embodiment of the foregoing refrigerant compressor, the motor cooling line receives cooling fluid from an outlet of the compression stage.

In a further non-limiting embodiment of the foregoing refrigerant compressor, the compression stage is a radial compression stage.

In a further non-limiting embodiment of the foregoing refrigerant compressor, the fluid passage delivers fluid upstream of the compression stage.

In a further non-limiting embodiment of the foregoing refrigerant compressor, the compression stage is configured to compress a fluid, wherein the fluid is a refrigerant.

In a further non-limiting embodiment of the foregoing refrigerant compressor, the refrigerant compressor is used in a heating, ventilation, and air conditioning (HVAC) chiller system.

A refrigerant system according to an exemplary aspect of the present disclosure includes, among other things, a main refrigerant loop including a compressor, a condenser, an evaporator, and an expansion device. The compressor includes a compression stage arranged along a shaft, wherein the shaft is hollow to define a fluid passage extending along the shaft. A motor is arranged along the shaft and configured to drive the compression stage. A motor cooling line is configured to convey a cooling fluid to the motor, wherein the motor cooling line is fluidly connected to the fluid passage.

In a further non-limiting embodiment of the foregoing refrigerant system, the motor cooling line comprises a stator cooling passageway and a rotor cooling passageway.

In a further non-limiting embodiment of the foregoing refrigerant system, the stator cooling passageway and the rotor cooling passageway join at an inlet of the fluid passage.

In a further non-limiting embodiment of the foregoing refrigerant system, the stator cooling passageway and the rotor cooling passageway join upstream of the motor.

In a further non-limiting embodiment of the foregoing refrigerant system, the stator cooling passageway extends circumferentially about a rotor of the motor.

In a further non-limiting embodiment of the foregoing refrigerant system, the rotor cooling passageway extends between a rotor and a stator of the motor.

In a further non-limiting embodiment of the foregoing refrigerant system, the motor cooling line receives cooling fluid from an outlet of the compression stage.

In a further non-limiting embodiment of the foregoing refrigerant system, the fluid passage delivers fluid upstream of the compression stage.

DETAILED DESCRIPTION

Figure 1:
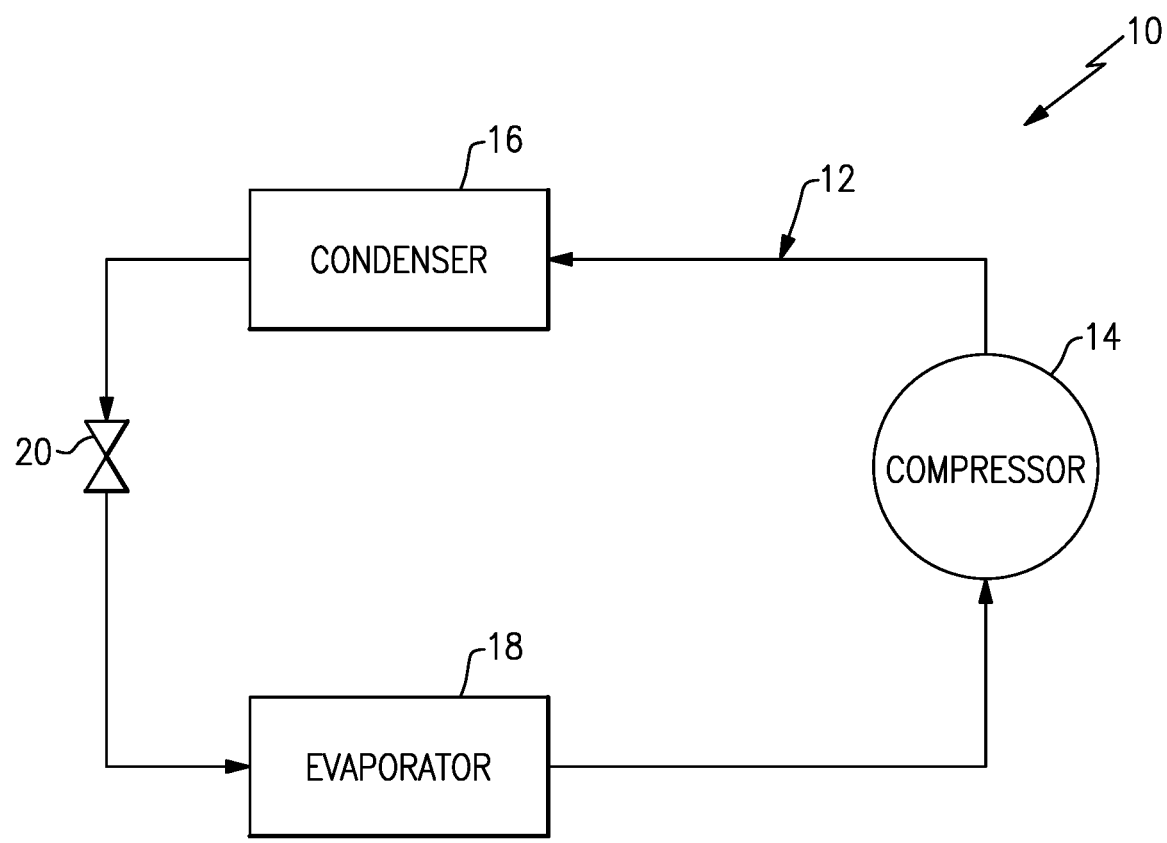
FIG. 1 schematically illustrates an example refrigerant system.

FIG. 1 illustrates a refrigerant system 10. The refrigerant system 10 includes a main refrigerant loop, or circuit, 12 in communication with a compressor 14, a condenser 16, an evaporator 18, and an expansion device 20. This refrigerant system 10 may be used in a chiller, for example. In that example, a cooling tower may be in fluid communication with the condenser 16. While a particular example of the refrigerant system 10 is shown, this application extends to other refrigerant system configurations, including configurations that do not include a chiller. For instance, the main refrigerant loop 12 can include an economizer downstream of the condenser 16 and upstream of the expansion device 20.

Figure 2:
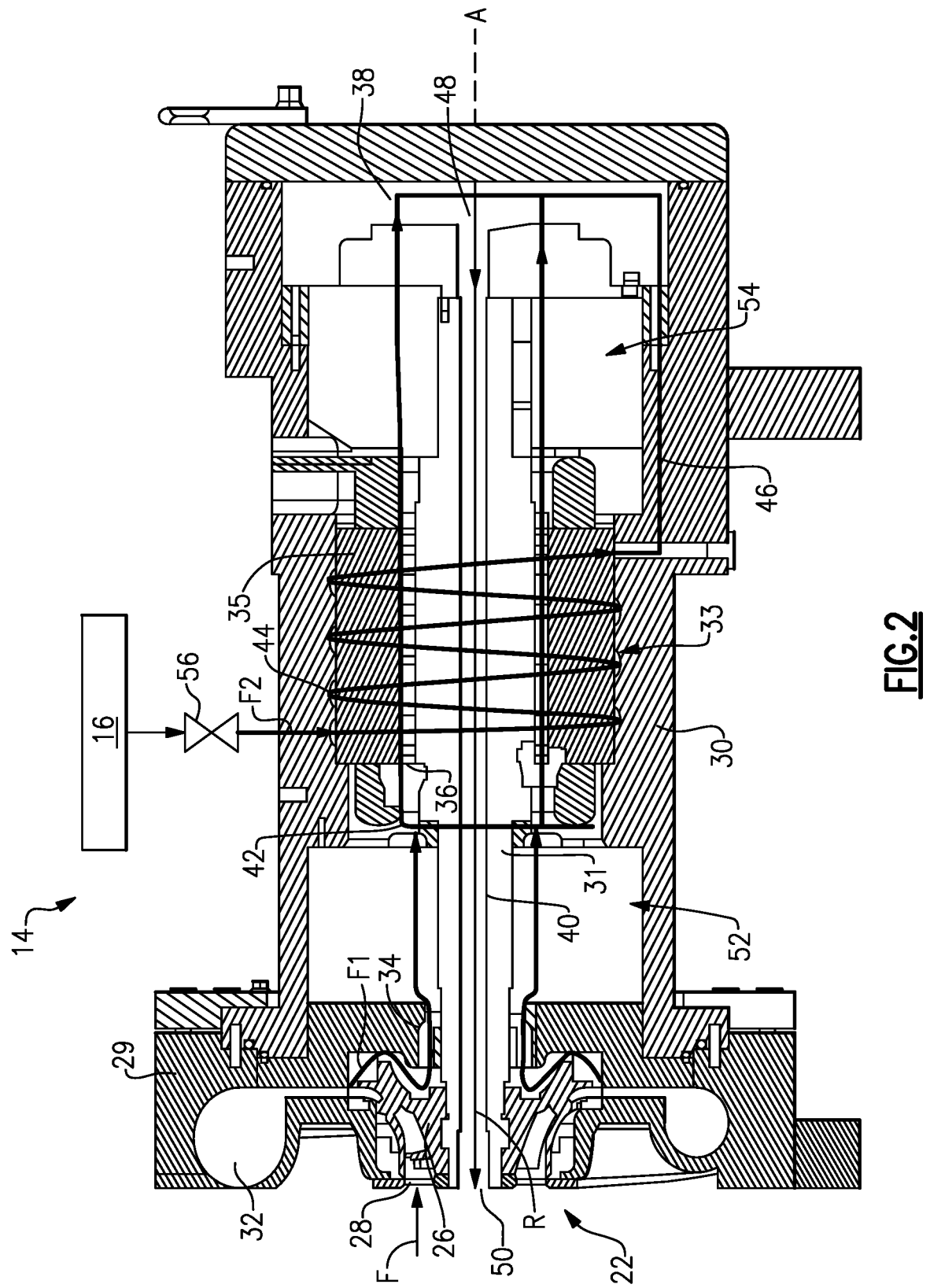
FIG. 2 illustrates an example compressor according to a first embodiment.

FIG. 2 illustrates an example refrigerant compressor 14 according to this disclosure. The compressor 14 includes a motor housing 30 within which an electric motor 33 is arranged. The electric motor 33 includes a stator 35 arranged radially outside of a rotor 36. The rotor 36 is connected to a shaft 31, which rotates to drive a compression stage 22 within a compressor housing 29. The motor housing 30 and the compressor housing 29 may be secured to one another, or may be a single unitary structure, for example. The compression stage 22 includes an impeller 26 mounted on the shaft 31 and rotatable about an axis A to compress refrigerant. The rotor shaft 31 is rotatably supported by first and second bearing assemblies 52, 54. A flow F of refrigerant from the evaporator 18 flows into the compression stage 22 at an inlet end 28 of the impeller 26, and is compressed and expelled radially outward at an outlet volute 32. The flow F then travels from the outlet volute 32 to the condenser 16. Although only one impeller 26 is shown, this disclosure may be used in compressors having more than one impeller.

In this example, a portion of the flow F is used to cool the motor 33 via a motor cooling line 42. As refrigerant enters an inlet end 28 of the impeller 26 and is expelled radially outward from an outlet end 32 thereof, a portion F1 of the flow F is leaked over the labyrinth seal 34 between the impeller 26 and the motor 33. The flow F1 flows along a rotor cooling passageway and is used to cool the rotor 36. In particular, the flow F1 leaks axially between the radial clearance between the rotor shaft 31 and the labyrinth seal 34, and is directed downstream toward the first bearing assembly 52. The flow F1 continues to flow past the motor 33 between the rotor 36 and the stator 35. The flow F1 is then directed through the second bearing assembly 54 to a cavity 38. As one skilled in this art would appreciate, the rotor cooling passageway may also provide cooling to the radially inner surface of the stator 35.

The electric motor 33 may be further cooled by routing a cooling flow F2 of refrigerant from the condenser 16, and directing it into the housing 30. The cooling flow F2 proceeds to circulate about the stator 35 by way of a circumferential passageway 44. In one example, the outer radial boundary of the circumferential passageway 44 is provided in part by a helical channel formed in an inner wall of the housing 30. In this example, an outer surface of the stator 35 provides an inner radial boundary for the circumferential passageway 44. While a helical channel is illustrated, other types of circumferential passageways 44 come within the scope of this disclosure. As used herein, the term circumferential passageway refers to a passageway provided adjacent the outer circumference of the stator 35.

Downstream of the stator 35, the cooling flow F2 is directed through a passageway 46 in the housing 30 to the cavity 38. Then, the cooling flow F2 intermixes with the flow F1. The cooling flows F1 and F2 are returned to a location 50 upstream of the compression stage 22. The shaft 31 is hollow to define a cooling passageway 40. The cooling passageway 40 extends longitudinally along the shaft 31 from a first end 48 near the cavity 38 to a second end 50. The cooling passageway 40 may be arranged along the axis A, for example. The cooling flows F1 and F2 flow through the cooling passageway 40 in the shaft 31 for use in the compression stage 22. The cooling flows F1 and F2 through the passageway 40 may help internally cool the rotor 36.

In this example, the cooling flow F2 is provided into the housing 30 initially as a sub-cooled liquid, and is heated to a super-heated vapor by the time the flow F2 reaches the cavity 38. In some examples, the cooling flow F2 is monitored for at least one of pressure and temperature, to ensure that the cooling flow F2 has changed phase into a gaseous state (e.g., by virtue of being heated by the stator 35) before entering the passageway 40. One or more conditions of the refrigeration system 10 may have to be adjusted, depending on the measured conditions of the cooling flow F2, to ensure that the appropriate phase change has occurred in the cooling flow F2. Regarding the stator cooling passageway, the flow of fluid F2 from the condenser 16 may optionally be expanded by an expansion device 56 before entering the circumferential passageway 44.

Figure 3:
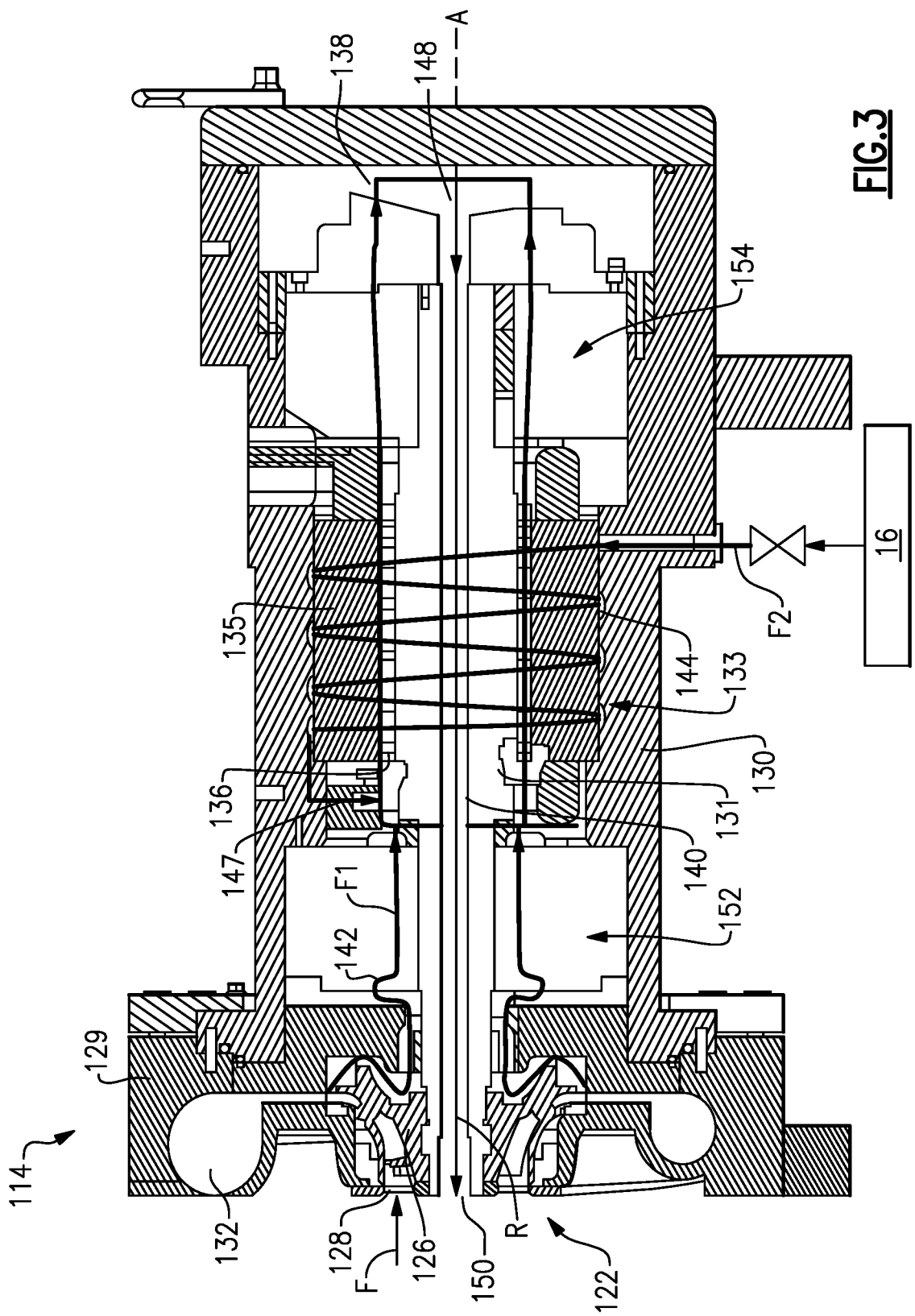
FIG. 3 illustrates an example compressor according to a second embodiment.

FIG. 3 illustrates another example compressor 114 according to this disclosure. To the extent not otherwise described or shown, the reference numerals in FIG. 3 generally correspond to those of FIG. 2, with like parts having reference numerals prepended with a "1."

In this example, the fluid flow F2 enters the housing 130 at a location near a downstream end of the motor 133. The fluid flow F2 travels upstream along the circumferential passageway 144, and joins the flow F1. That is, the fluid flow F2 flows through the circumferential passageway 144 in a direction towards the impeller 26. The flow F2 joins the flow F1 at a location 147 between the motor 133 and the first bearing assembly 152. The fluid flow F2 then travels along with the flow F1 between the rotor 136 and the stator 135. Thus, the fluid flow F2 first cools the stator 135 via the circumferential passageway 144, then joins the flow F1 to cool the rotor 136. The fluid flows F1, F2 then flow past the second bearing assembly 154 to the cavity 138. From the cavity 138, the fluid flows F1, F2 are returned to a suction end of the compression stage 122 via the passageway 140 in the shaft 131.

The disclosed motor cooling return using a hollow shaft may eliminate additional piping external to the compressor or internal flowpaths within the compressor. This may simplify the compressor and compressor housing. This may also provide improved cooling of the motor, and particularly the rotor, by routing coolant through the hollow shaft.

It should be understood that terms such as "axial" and "radial" are used above with reference to the normal operational attitude of a compressor. Further, these terms have been used herein for purposes of explanation, and should not be considered otherwise limiting. Terms such "generally," "about," and "substantially" are not intended to be boundaryless terms, and should be interpreted consistent with the way one skilled in the art would interpret those terms.

Although the different examples have the specific components shown in the illustrations, embodiments of this disclosure are not limited to those particular combinations. It is possible to use some of the components or features from one of the examples in combination with features or components from another one of the examples.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:
1. A refrigerant compressor, comprising:
   a shaft, wherein the shaft is hollow to define a fluid passage extending along the shaft;
   a motor arranged along the shaft; and
   a motor cooling line configured to convey a cooling fluid to the motor, wherein the motor cooling line is fluidly connected to the fluid passage, wherein the motor is configured to rotationally drive a compression stage via the shaft,
wherein the motor cooling line comprises a stator cooling passageway and a rotor cooling passageway, and
wherein the stator cooling passageway and the rotor cooling passageway join at an inlet of the fluid passage.

2. The refrigerant compressor as recited in claim 1, wherein the stator cooling passageway extends circumferentially about a rotor of the motor.

3. The refrigerant compressor as recited in claim 1, wherein the rotor cooling passageway extends between a rotor and a stator of the motor.

4. The refrigerant compressor as recited in claim 1, wherein the motor cooling line receives cooling fluid from an outlet of the compression stage.

5. The refrigerant compressor as recited in claim 1, wherein the compression stage is a radial compression stage.

6. The refrigerant compressor as recited in claim 1, wherein the fluid passage delivers fluid upstream of the compression stage.

7. The refrigerant compressor as recited in claim 1, wherein the compression stage is configured to compress a fluid, wherein the fluid is a refrigerant.

8. The refrigerant compressor as recited in claim 1, wherein the refrigerant compressor is used in a heating, ventilation, and air conditioning (HVAC) chiller system.

9. A refrigerant system comprising:
a main refrigerant loop including a compressor, a condenser, an evaporator, and an expansion device, wherein the compressor includes:
a compression stage arranged along a shaft, wherein the shaft is hollow to define a fluid passage extending along the shaft;
a motor arranged along the shaft and configured to drive the compression stage; and
a motor cooling line configured to convey a cooling fluid to the motor, wherein the motor cooling line is fluidly connected to the fluid passage,
wherein the motor cooling line comprises a stator cooling passageway and a rotor cooling passageway, and
wherein the stator cooling passageway and the rotor cooling passageway join at an inlet of the fluid passage.

10. The refrigerant system of claim 9, wherein the stator cooling passageway extends circumferentially about a rotor of the motor.

11. The refrigerant system of claim 9, wherein the rotor cooling passageway extends between a rotor and a stator of the motor.

12. The refrigerant system of claim 9, wherein the motor cooling line receives cooling fluid from an outlet of the compression stage.

13. The refrigerant system of claim 9, wherein the fluid passage delivers fluid upstream of the compression stage.

* * * * *